United States Patent
Silva et al.

(10) Patent No.: US 10,877,946 B1
(45) Date of Patent: Dec. 29, 2020

(54) EFFICIENT INCIDENT RESPONSE THROUGH TREE-BASED VISUALIZATIONS OF HIERARCHICAL CLUSTERING

(71) Applicant: Symantec Corporation, Mountain View, CA (US)

(72) Inventors: David Silva, Dublin (IE); Matteo Dell'Amico, Valbonne (FR); Kevin Alejandro Roundy, El Segundo, CA (US); Michael Hart, Farmington, CT (US); Christopher Gates, Venice, CA (US)

(73) Assignee: NortonLifeLock Inc., Tempe, AZ (US)

( * ) Notice: Subject to any disclaimer, the term of this patent is extended or adjusted under 35 U.S.C. 154(b) by 219 days.

(21) Appl. No.: 15/610,505

(22) Filed: May 31, 2017

(51) Int. Cl.
| | | |
|---|---|---|
| *G06F 16/21* | (2019.01) | |
| *G06F 16/248* | (2019.01) | |
| *G06F 16/28* | (2019.01) | |
| *G06F 16/22* | (2019.01) | |

(52) U.S. Cl.
CPC ........ *G06F 16/211* (2019.01); *G06F 16/2246* (2019.01); *G06F 16/248* (2019.01); *G06F 16/287* (2019.01)

(58) Field of Classification Search
None
See application file for complete search history.

(56) References Cited

U.S. PATENT DOCUMENTS

| | | | |
|---|---|---|---|
| 9,306,962 B1* | 4/2016 | Pinto | H04L 63/1416 |
| 2008/0034425 A1* | 2/2008 | Overcash | G06F 21/55 726/22 |
| 2010/0223212 A1* | 9/2010 | Manolescu | G06Q 10/06 706/12 |
| 2013/0298244 A1* | 11/2013 | Kumar | G06F 21/52 726/25 |
| 2014/0237599 A1* | 8/2014 | Gertner | H04L 63/1441 726/24 |
| 2017/0222961 A1* | 8/2017 | Beach | H04L 51/16 |
| 2017/0251013 A1* | 8/2017 | Kirti | H04L 63/1416 |
| 2018/0032862 A1* | 2/2018 | Oliner | G06N 3/0445 |

* cited by examiner

*Primary Examiner* — Aleksandr Kerzhner
*Assistant Examiner* — Eddy Cheung
(74) *Attorney, Agent, or Firm* — Brill Law Office; Jeffrey Brill (57) ABSTRACT

A computer system stores incident records in a database. When a user wants to resolve a particular current incident, the computer system will access the current incident record from an incident queue. The computer system also identifies historical incident records that share one or more attributes with the current incident record. The computer system creates a plurality of clusters from the current incident record and the selected historical incident records. The clusters are then arranged into a hierarchical tree. This hierarchical tree is presented in a graphical user interface. A user can select a node to access additional information for that node. The computer system generates a first suggested response to a particular current incident based on the incident records included in the selected node. The computer system presents the first suggested response to the particular current incident in a graphical user interface.

20 Claims, 7 Drawing Sheets

| COUNT 440 | INCIDENT TYPE 442 | INCIDENT TIME 444 | CUSTOMER SEVERITY 446 | CLUSTER NUMBER 448 |
|---|---|---|---|---|
| 5 | LOGIN BRUTE FORCE | 2016-06-09 9:30 | 2 | 430 ⟵ 450 |
| AGGERATED COUNT | | WEIGHT | BLOCKED? | IP COUNT |
| 2 | ICMP FLOOD DETECTION | 0.49 | 0 | 1 ⟵ 452 |
| 2 | SUSPICIOUS DOWNLOAD | 0.43 | 0 | 1 ⟵ 454 |
| 3 | INVALID PACKETS | 0.42 | 0 | 1 ⟵ 456 |
| 1 | TLS ATTACK PREVENTION | 0.41 | 0 | 1 ⟵ 458 |
| | TCP CONNECTION RESET | | | |
| 5 | NETWORK INTEL | 2016-04-26 1:23 | 1 | 424 ⟵ 460 |
| 10 | WORM INFECTION | 2017-01-26 5:24 | 5 | 408 ⟵ 462 |
| 3 | TROJAN HORSE INFECTION | 2016-10-12 8:39 | 3 | 430 ⟵ 464 |

FIGURE 4C

Figure 5

EFFICIENT INCIDENT RESPONSE THROUGH TREE-BASED VISUALIZATIONS OF HIERARCHICAL CLUSTERING

CROSS-REFERENCE TO RELATED APPLICATION

The present application is related to and incorporates by reference the entire contents of the U.S. patent application Ser. No. 15/281,130, titled "Systems and Methods for Managing Computer Security of Client Computing Machines," filed Sep. 30, 2016, and having the same assignee.

TECHNICAL FIELD

This disclosure pertains generally to computer security, and more specifically to using tree-based visualizations of hierarchical clustering to efficiently respond to potential incidents.

BACKGROUND

Malware, such as computer viruses, worms and Trojan horses, is a serious threat to both business and personal computing. Various software vendors provide anti-malware products, which can detect, block and/or remove malware on a user's computer. Anti-malware products use various techniques to protect users from malware, such as, but not limited to, intrusion prevention, web browser defense, signature based detection, heuristic based detection, and behavior based detection. When an anti-malware product detects a specific potential instantiation of malware, the anti-malware product can create an incident record detailing the infection. The incident record can then be viewed in a console and a response can be determined.

A key task in incident response is the need to determine the full scope of an infection. Incident response consoles frequently do not support this, and require tedious manual determination of which incidents are related to one another, each of which must separately be marked as resolved.

Clustering can be used to help with this task, but clustering at the best possible granularity is not easily done. It would be much better to give the incident responder control over the clustering granularity. Given that the goal of clustering is to help analysts to efficiently dispatch events, using the probable response of the analyst is key to providing a useful clustering algorithm.

It would be desirable to address these issues.

SUMMARY

A computer system stores incident records in a database. An incident record represents a particular instance in which a potential computer security threat was detected at a client system. In some example embodiments, the incident records included both historical incident records and current incident records. In some example embodiments, the incident records include a record of what was done in response to the detected potential threat (sometimes called a completed response record).

When a user, such as a computer security analyst, wants to resolve a particular current incident, the computer system will access the current incident record from an incident queue. The computer system also identifies historical incident records that share one or more attributes with the current incident record. The computer system creates a plurality of clusters from the current incident record and the selected historical incident records. The clusters are then arranged into a hierarchical tree. This hierarchical tree is presented in a graphical user interface. A user can select a node to access additional information for that node. In some example embodiments, the shape, color, size, and boldness used to display a node in the graphical user interface is associated with at least one attribute of the node.

In some example embodiments, the hierarchical tree is initially displayed in full, with all parent nodes and child nodes visible without any user interaction. In other embodiments, only a subsection of the hierarchical tree is initially displayed (e.g., based on the size of the user interface or the complexity of the hierarchical tree). When only a subsection of the hierarchical tree is initially displayed, the user may cause the hierarchical tree to be updated by selecting displayed nodes. When a user selects a node, the computer system updates the hierarchical tree presented to display child nodes of the select node. The child nodes are more granular than the selected node. The computer system generates a first suggested response to a particular current incident based on the incident records included in the selected node. To do so, the computer system analyzes one or more incident records associated with a node selected by a user. The computer system identifies, from the one or more incident records, a list of completed actions for the one or more incident records.

The computer system selects a completed action from the list of completed actions. In some example embodiments, a particular completed action is selected from the list of completed actions based on the frequency with which the particular action was used in the historical incident records. If a particular action is the most common action for all incident records in the selected node, the system may choose to recommend that action. In other embodiments, the computer system selects a completed action based on a success rate of the completed actions.

The computer system presents the first suggested response to the particular current incident in a graphical user interface. In some example embodiments, the computer system receives a user-selected action to respond to the current incident record. The computer system then performs the user-selected action. Once the action selected by the user is performed, the computer system evaluates the action to determine whether the current incident record was resolved by the action. Once the current incident record is resolved, the computer system adds the current incident record to the historical incident records for future clustering.

In some example embodiments, while presenting the hierarchical tree in the graphical user interface, the computer system presents a grid-based information display structure adjacent to the hierarchical tree. In response to user selection of the first node, the computer system presents additional information associated with the incident records included with the first node in the grid-based information display structure.

In some example embodiments, the computer system receives user selection of the first child node. In response, the computer system generates a second suggested response based on the incident records included in the first child node, wherein the second suggested response is different than the first suggested response.

The features and advantages described in this summary and in the following detailed description are not all-inclusive, and particularly, many additional features and advantages will be apparent to one of ordinary skill in the relevant art in view of the drawings, specification, and claims hereof. Moreover, it should be noted that the language used in the specification has been principally selected for readability and instructional purposes, and may not have been selected to delineate or circumscribe the inventive subject matter, resort to the claims being necessary to determine such inventive subject matter.

The figures depict various embodiments for purposes of illustration only. One skilled in the art will readily recognize from the following discussion that alternative embodiments of the structures and methods illustrated herein may be employed without departing from the principles described herein.

DESCRIPTION

An incident management system 120 is described herein that can present tree-based visualizations of hierarchical clustering to users and thereby enable them to efficiently respond to incidents. For example, the incident management system 120 can cause a graphical representation of a hierarchical tree of clustered incidents to be displayed to a user. The user can, through interacting with the nodes, determine the level of granularity needed to identify a proper response to a particular incident.

The incident management system 120 stores historical incident record data, which included details of potential incidents in the past and details that represent the actions taken in response to such incidents. When one or more current incident records are received, the incident management system 120 identifies historical incident record data that is relevant (based on attributes common to both) to the received one or more current incident. The historical incident data is grouped with current incident data. The tree generator uses clustering functionality to cluster the combined incident records (e.g., both the current and historical incident data) into a plurality of nodes, and to arrange the nodes into a hierarchical tree. In some example embodiments, the tree generator uses the clustering functionality described in U.S. patent application Ser. No. 15/281,130, which is incorporated herein in its entirety. In other example embodiments, the tree generator can use other clustering functionality to create a hierarchical tree structure from the plurality of incident records. The output of the clustering program is a series of nodes (e.g., one or more clusters) that include one or more incident records that have commonalities.

The result will be a clustering of old and new data alike, at different granularities. Old data serves to provide a context to new data (i.e., what past similar incidents were), and is used to suggest to the analyst an action to take. For example, if a new incident is in a cluster where 95% of old incidents were marked as false positives, the suggested action will be to mark it as a false positive as well.

Once the incident data has been clustered into groups and relationships between groups are added to form a hierarchical tree, the incident management system 120 creates a visual representation of the hierarchical data tree for display to a user. The user interface allows a user to traverse up and down the hierarchical tree to determine a specific level of granularity the user prefers. As the user selects nodes further down the tree, the number of incidents is reduced but the similarity to a current incident is increased.

Once the user has selected a node at a particular level of granularity, the incident management system analyzes one or more incident records clustered in to the selected node at the identified level of granularity and determines a recommended response action. The user (e.g., an analyst) can then choose to take the recommended response action, select a different level of granularity, or take another action all together.

An incident record may encode an incident type as features of clustered historical data (e.g., historical incident records). Thus, the clustering algorithm may cluster the incident nodes using incident type as one of the clustering factors so that, at a certain level of granularity, a cluster may include just one incident type. Thus, in some example embodiments, the incident management system is able to recommend an incident type for new incidents in a cluster that includes a single incident type.

In some example embodiments, the incident management system produces a graphical user interface that displays the generated hierarchical tree to a user. In some example embodiments, a user is located at a client system 102 located remotely from the incident management system 120 and data used to display a graphical user interface that contains a hierarchical tree is transmitted to the client system). A user (e.g., an analyst) can interact with the presented hierarchical tree to choose a clustering granularity at which to examine incidents, and use them to understand context, with the goal of improving the speed, accuracy (taking correct actions) and consistency (treating analogous events in the same way) of their work.

Figure 1:
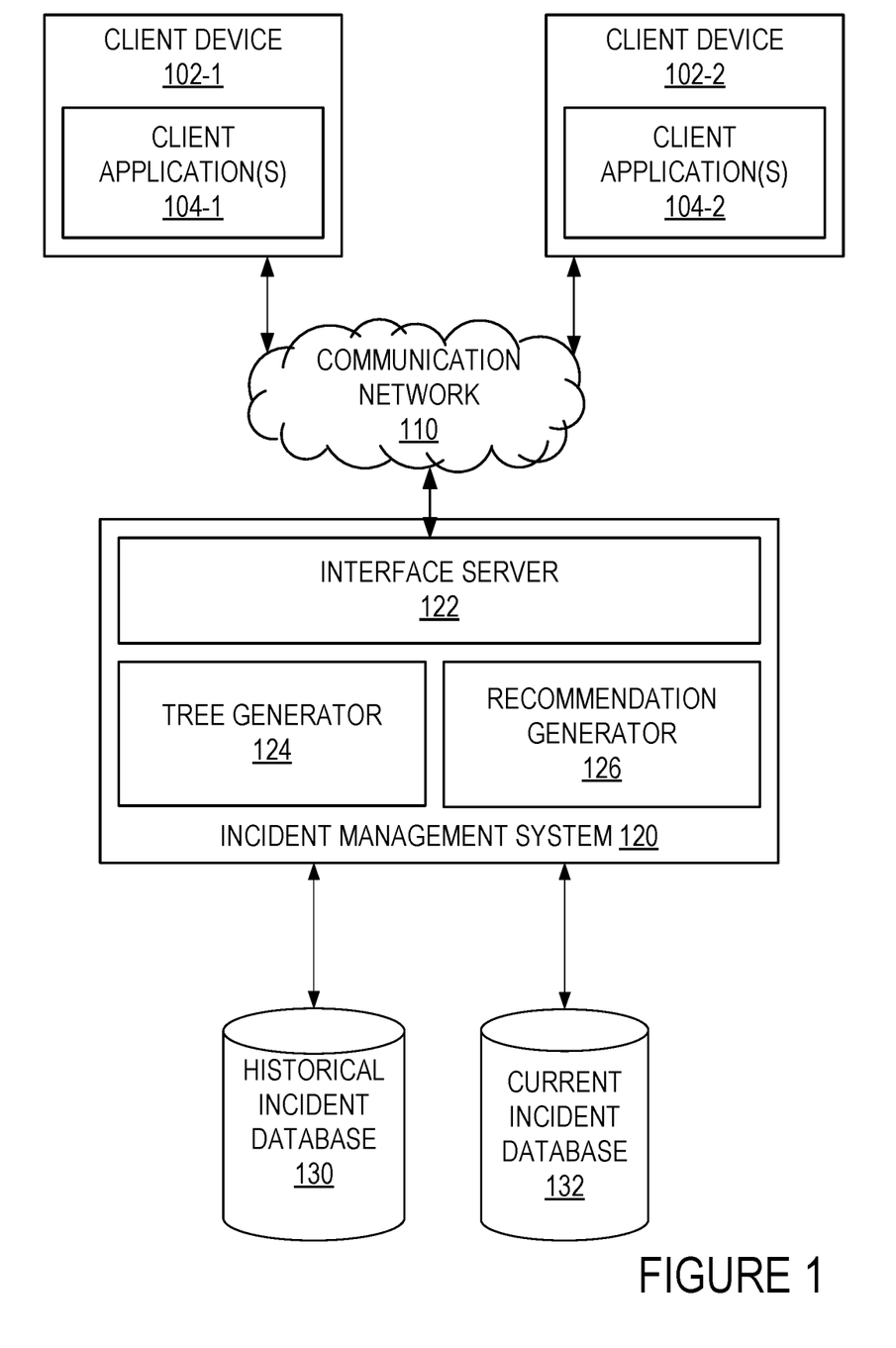
FIG. 1 is a network diagram depicting a client-server system environment that includes various functional components of an incident management system, in accordance with some example embodiments.

FIG. 1 is a network diagram depicting a client-server system environment 100 that includes various functional components of an incident management system 120, in accordance with some example embodiments. It should be recognized that when there are multiple instances of a similar element are depicted they will be labeled with the same reference number followed by a dash ("-") and another number or letter (e.g., 102-1) to designate different instances. In the event a reference numeral appears in the text without a dash and subsequent number or letter, for example, "102," it should be recognized that such is a general reference to a generic instance of the element or component bearing that general reference numeral. For example, client systems 102-1 and 102-2 are both included in FIG. 1, but the reference number 102 may be used to reference a generic client system.

The client-server system environment 100 includes two or more client systems 102-1 and 102-2 and the incident management system 120. One or more communication networks 110 interconnect these components. The communication networks 110 may be any of a variety of network types, including local area networks (LANs), wide area networks (WANs), wireless networks, wired networks, the Internet, personal area networks (PANs), or a combination of such networks.

The client systems 102-1 and 102-2 may be electronic devices, such as a personal computer (PC), a laptop, a smartphone, a tablet, a mobile phone, a wearable electronic device or any other electronic device capable of communication with the communication network 110. The client system 102 may include one or more client applications 104-1 and 104-2, which are executed by the client system 102. In some example embodiments, the client applications include one or more applications from a set consisting of search applications, communication applications, productivity applications, game applications, word processing applications, or any other useful applications. The client applications may include a web browser. A client system 102 may use a web browser to send and receive requests to and from the incident management system 120 and to display information received from the incident management system 120.

A client system (102-1 or 102-2) may be associated with a particular user (e.g., an analyst) that operates the client system (102-1 or 102-2) and uses one or more client applications installed on the client system 102-1 or 102-2. A client system 102 may include an application specifically customized for communication with the incident management system 120 (e.g., an application associated with the incident management system 120).

A client system 102 may send a request to the incident management system 120 to receive a hierarchical incident tree and transmit action with respect to the tree or a specific incident to the incident management system 120 through the communication network 110. For example, a user accesses an incident queue stored at the incident management system 120 and retrieves a hierarchical tree of associated historical and current incidents. The retrieved data is displayed in a graphical user interface at the client system (e.g., system 102 in FIG. 1).

As shown in FIG. 1, the incident management system 120 may include an interface server 122, a tree generator 124, and a recommendation generator 126. In addition, the incident management system 120 includes a historical incident database 130 and a current incident database 132. It should be noted that the interface server 122, the tree generator 124, and the recommendation generator 126 may be implemented as software, hardware, firmware, or a combination of these.

The interface server 122 may receive requests from various client systems 102 and communicate appropriate responses to the requesting client systems 102. For example, the interface server 122 may receive requests in the form of Hypertext Transfer Protocol (HTTP) requests, or other web-based, application programming interface (API) requests. The client system 102 may be executing web browser applications or applications that have been developed for a specific platform to include any of a wide variety of mobile devices and operating systems.

The incident management system 120 may include a tree generator 124 that generates, for a particular set of current incidents in an incident queue (e.g., one incident or a plurality of incidents) a clustered hierarchical tree that groups a plurality of historical and current incidents based on the characteristics of those incidents. In some example embodiments, based on characteristics of an incident.

Once the tree generator 124 has generated the clustered hierarchical tree, the incident management system 120 transmits data representing the clustered hierarchical tree to a client system 102 to be displayed in a graphical user interface. A user can then access the clustered hierarchical tree to view the incidents at each node, wherein each node has a parent and the parents are broader categories than their children nodes. Thus, children nodes in the tree will have fewer included incident records and the included incident records will be more closely associated.

In some example embodiments, the recommendation generator 126, after a user has chosen a node at a preferred level of granularity, analyzes the incident records associated with the node in the preferred level of granularity and identifies one or more completed response records. A completed response record is a record of the response taken in response to a particular incident report. A completed response may also be called a completed action. The recommendation generator identifies the completed responses that are the most common (or most successful) among the incidents that are included at the level of granularity selected by the user.

In some example embodiments, the identified actions are presented to a user of the incident management system 120. In other embodiments, the user is at a client system remote from the incident management system 120 and the recommended action is transmitted to the user at the client system 102. The incident management system 120 may then receive data from a client system 102 indicating the action the user wishes to take.

The historical incident database 130 may store records for historical incidents that have been previously addressed by the incident management system 120. A particular record for a historical incident includes information about the type of incident, the time of the incident, any data sent from or received by the system, any files discovered on the potentially infected system, the incident type, and any actions taken or determinations made. In some example embodiments, a given incident can include a variety of different actions by a single instance of malware. The multiple actions can be grouped into a single incident for the sake of analysis.

The current incident database 132 may store an incident queue for currently pending incidents (e.g., incidents that still haven't been resolved). A particular record for a current incident includes information about the type of incident, the time of the incident, any data sent from or received by the system, and any files discovered on the potentially infected system.

Figure 2:
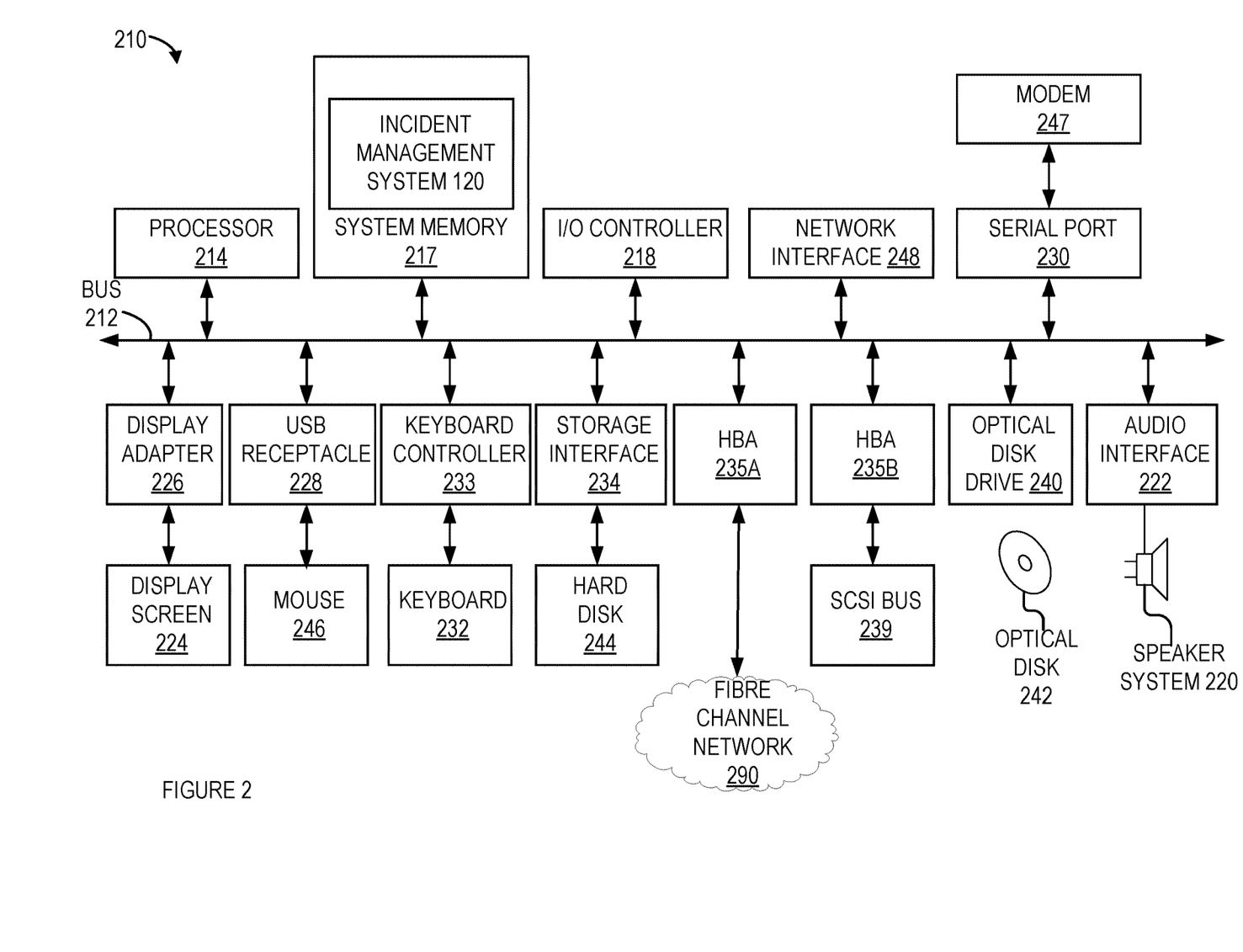
FIG. 2 is a block diagram of a computer system suitable for implementing an incident management system, according to some embodiments.

FIG. 2 is a block diagram of a computer system 210 suitable for implementing an incident management system 120. Clients 102 and system 210 can all be implemented in the form of such computer systems 210. As illustrated, one component of the computer system 210 is a bus 212. The bus 212 communicatively couples other components of the computer system 210, such as at least one processor 214, system memory 217 (e.g., random access memory (RAM), read-only memory (ROM), flash memory), an input/output (I/O) controller 218, an audio output interface 222 communicatively coupled to an audio output device such as a speaker 220, a display adapter 226 communicatively coupled to a video output device such as a display screen 224, one or more interfaces such as Universal Serial Bus (USB) ports 228, serial ports 230, parallel ports (not illustrated), etc., a keyboard controller 233 communicatively coupled to a keyboard 232, a storage interface 234 communicatively coupled to one or more hard disk(s) 244 (or other form(s) of storage media), a host bus adapter (HBA) interface card 235A configured to connect with a Fibre Channel (FC) network 290, an HBA interface card 235B configured to connect to a SCSI bus 239, an optical disk drive 240 configured to receive an optical disk 242, a mouse 246 (or other pointing device) coupled to the bus 212, e.g., via a USB port 228, a modem 247 coupled to bus 212, e.g., via a serial port 230, and one or more wired and/or wireless network interface(s) 248 coupled, e.g., directly to bus 212.

Other components (not illustrated) may be connected in a similar manner (e.g., document scanners, digital cameras, printers, etc.). Conversely, all of the components illustrated in FIG. 2 need not be present (e.g., smartphones and tablets typically do not have optical disk drives 240, external keyboards 232 or external pointing devices 246, although various external components can be coupled to mobile computing devices via, e.g., USB ports 228). In different embodiments, the various components can be interconnected in different ways from that shown in FIG. 2.

The bus 212 allows data communication between the processor 214 and system memory 217, which, as noted above, may include ROM and/or flash memory as well as RAM. The RAM is typically the main memory into which the operating system and application programs are loaded. The ROM and/or flash memory can contain, among other code, the Basic Input-Output system (BIOS) which controls certain basic hardware operations. Application programs (e.g., in some instances, the tree generator 124, the recommendation generator 126, etc.) can be stored on a local computer readable medium (e.g., hard disk 244, optical disk 242, flash memory) and loaded into system memory 217 and executed by the processor 214. Application programs can also be loaded into system memory 217 from a remote location (i.e., a remotely located computer system 210), for example via the network interface 248. In FIG. 2, the incident management system 120 is illustrated as residing in system memory 217. The workings of the incident management system 120 are explained in greater detail below in conjunction with FIG. 3.

The storage interface 234 is coupled to one or more hard disks 244 (and/or other standard storage media). The hard disk(s) 244 may be a part of computer system 210, or may be physically separate and accessed through other interface systems.

The network interface 248 and/or modem 247 can be directly or indirectly communicatively coupled to a network 107 such as the Internet. Such coupling can be wired or wireless.

Figure 3:
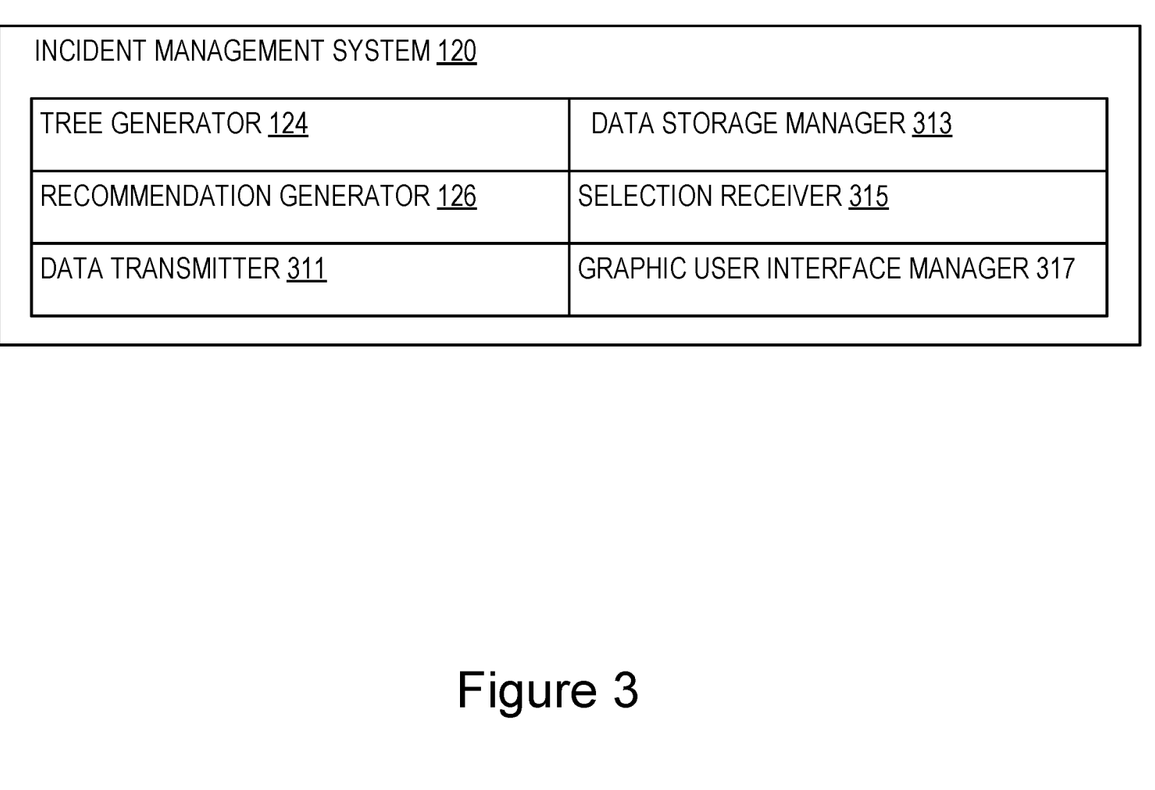
FIG. 3 illustrates components of an incident management system, according to some embodiments.

FIG. 3 illustrates components of incident management system 120, according to some embodiments. As described above, the functionalities of the incident management system 120 can reside on a server, a client, or be distributed between multiple computer systems 210, including within a cloud-based computing environment in which the functionality of the incident management system 120 is provided as a service over a network 110. It is to be understood that although the incident management system 120 is illustrated in FIG. 3 as a single entity, the illustrated incident management system 120 may represent a collection of functionalities, which can be instantiated as a single or multiple modules as desired (an instantiation of specific, multiple modules of the incident management system 120 is illustrated in FIG. 3).

It is to be understood that the modules of the incident management system 120 can be instantiated (for example as object code or executable images) within the system memory 217 (e.g., RAM, ROM, flash memory) of any computer system 210, such that when the processor 214 of the computer system 210 processes a module, the computer system 210 executes the associated functionality. As used herein, the terms "computer system," "computer," "client," "client computer," "server," "server computer" and "computing device" mean one or more computers configured and/or programmed to execute the described functionality. Additionally, program code to implement the functionalities of the incident management system 120 can be stored on computer-readable storage media. Any form of tangible computer readable storage medium can be used in this context, such as magnetic or optical storage media. As used herein, the term "computer readable storage medium" does not mean an electrical signal separate from an underlying physical medium.

In different embodiments, the incident management system 120 can be in the form of functionality provided by an application running on a computing device, which in turn can, but need not be, a more comprehensive security application. It is to be understood that although the incident management system 120 is illustrated in FIG. 3 as a single entity, the incident management system 120 represents a collection of functionalities, which can be instantiated as a single or multiple modules as desired.

In some embodiments, the tree generator 124, the recommendation generator 126, the data transmitter 311, the data storage manager 313, the selection receiver 315, and the graphical user interface manager 317 may be implemented as software, hardware, or a combination of these. In some embodiments, the tree generator 124, the recommendation generator 126, the data transmitter 311, the data storage manager 313, the selection receiver 315, and the graphical user interface manager 317 may be communicatively coupled by the bus 212 and/or the processor(s) 214 to one another and/or the other components of the computer system 210. In some embodiments, one or more of the tree generator 124, the recommendation generator 126, the data transmitter 311, the data storage manager 313, the selection receiver 315, and the graphical user interface manager 317 are sets of instructions executable by the processor(s) 214.

In further embodiments, one or more of the tree generator 124, the recommendation generator 126, the data transmitter 311, the data storage manager 313, the selection receiver 315, and the graphical user interface manager 317 are storable in the memory(ies) 217 and are accessible and executable by the processor(s) 214. In any of the foregoing embodiments, the tree generator 124, the recommendation generator 126, the data transmitter 311, the data storage manager 313, the selection receiver 315, and the graphical user interface manager 317 may be adapted for cooperation and communication with the processor(s) 214 and other components of the computer system 210.

Figure 4A:
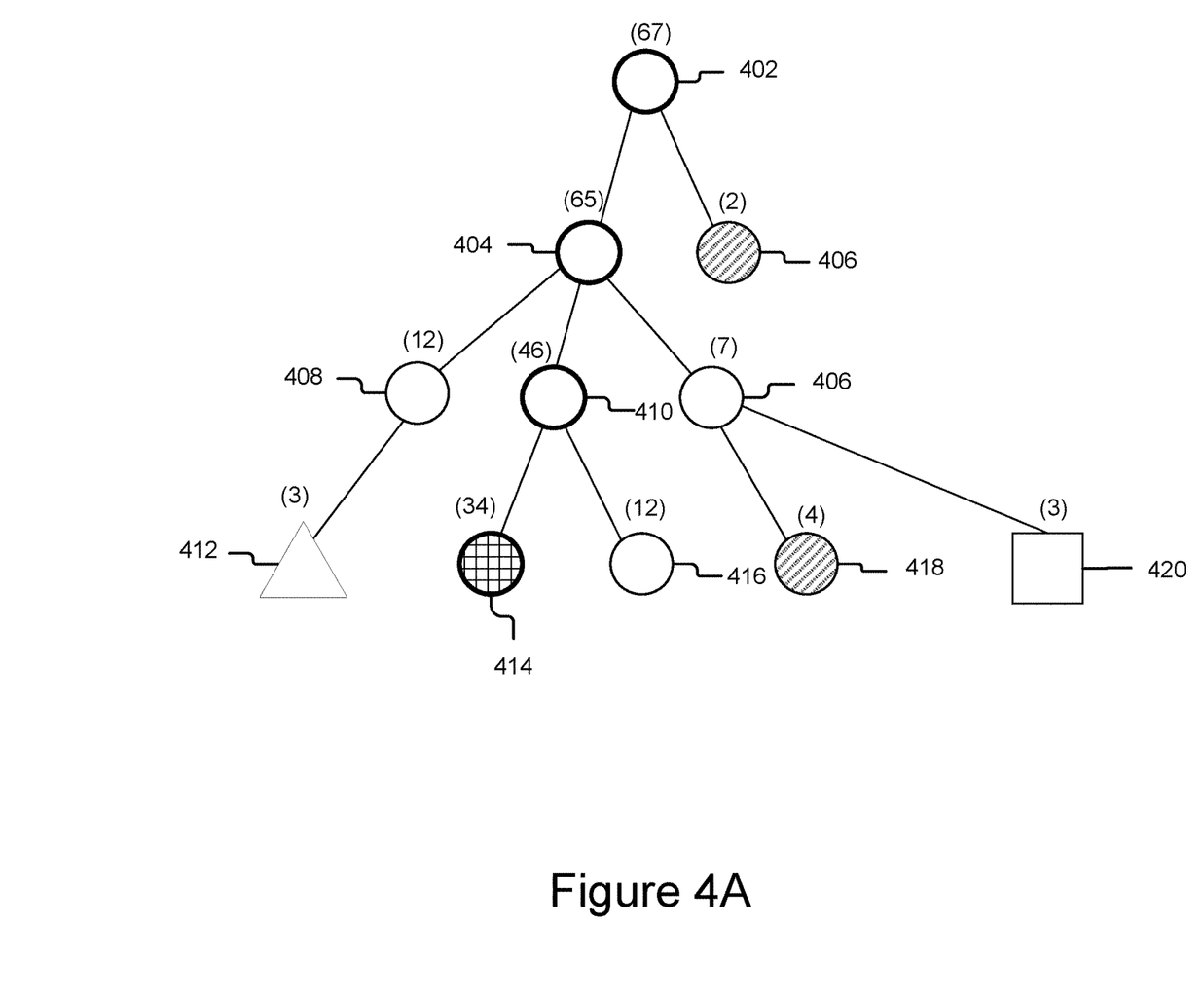
FIGS. 4A-4C are user interface diagrams illustrating examples of a user interface that displays a graphic representation of a hierarchical tree and a grid-based information display structure, according to some embodiments.
Figure 4B:
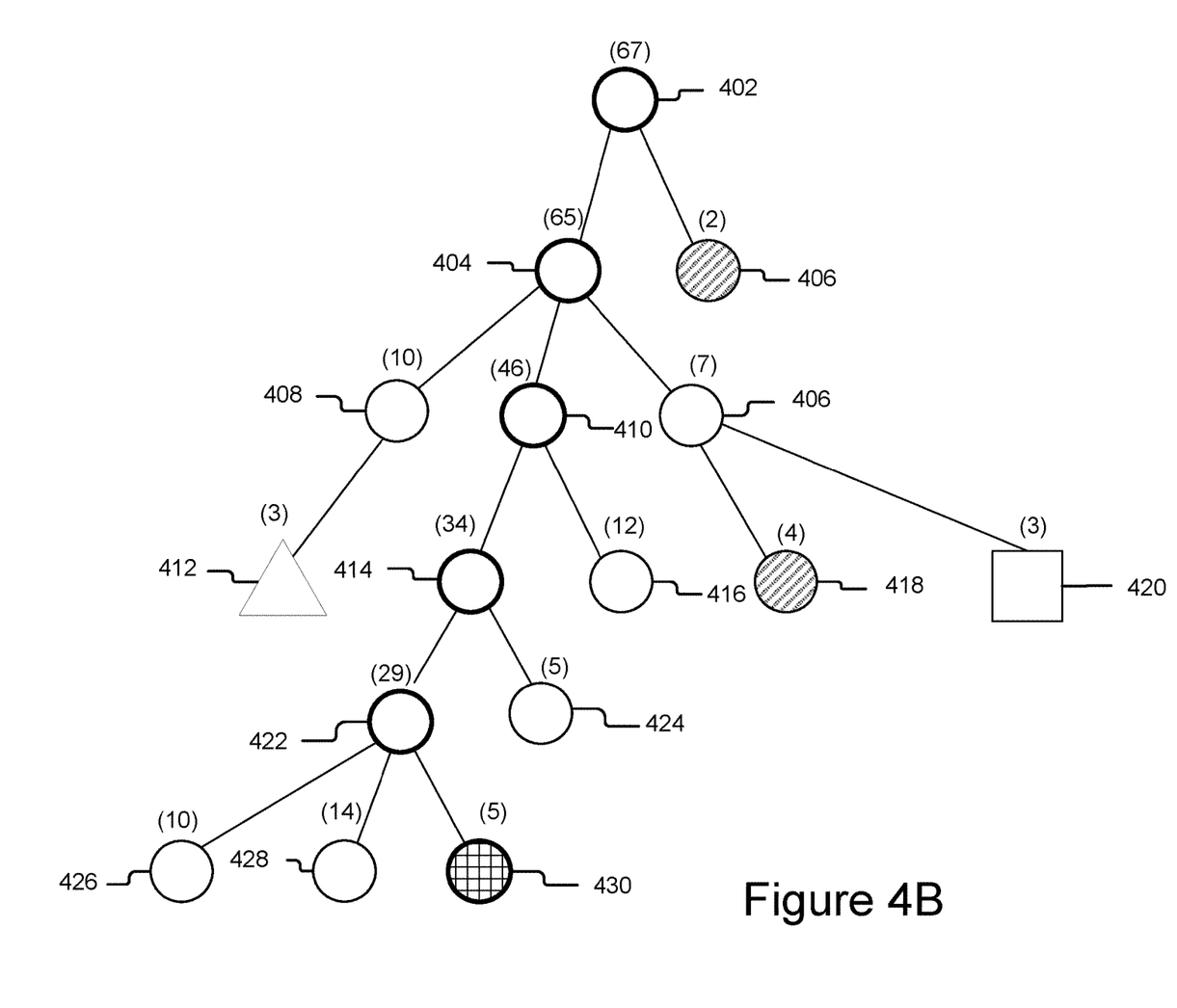
Figure 4C:
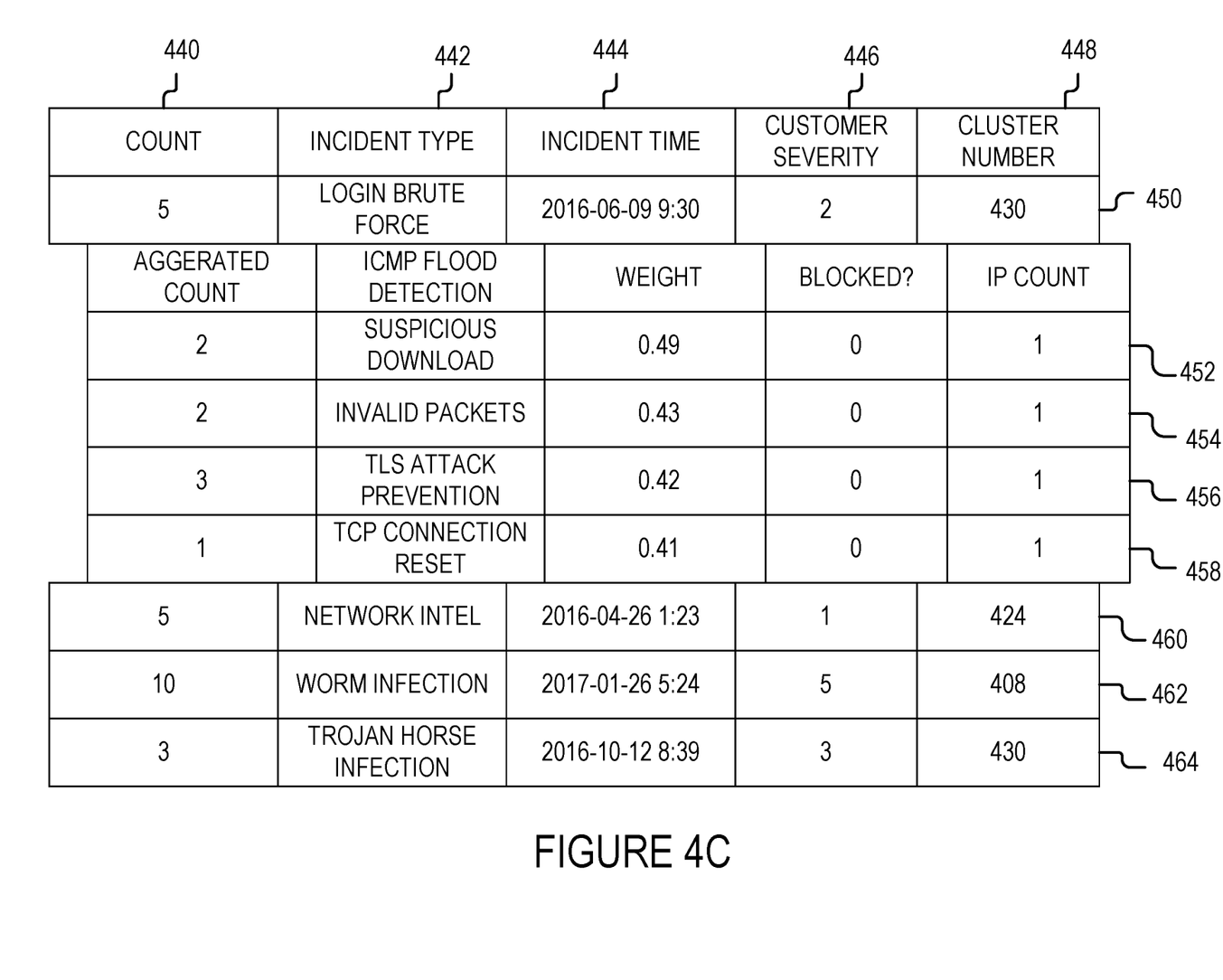
Figure 5:
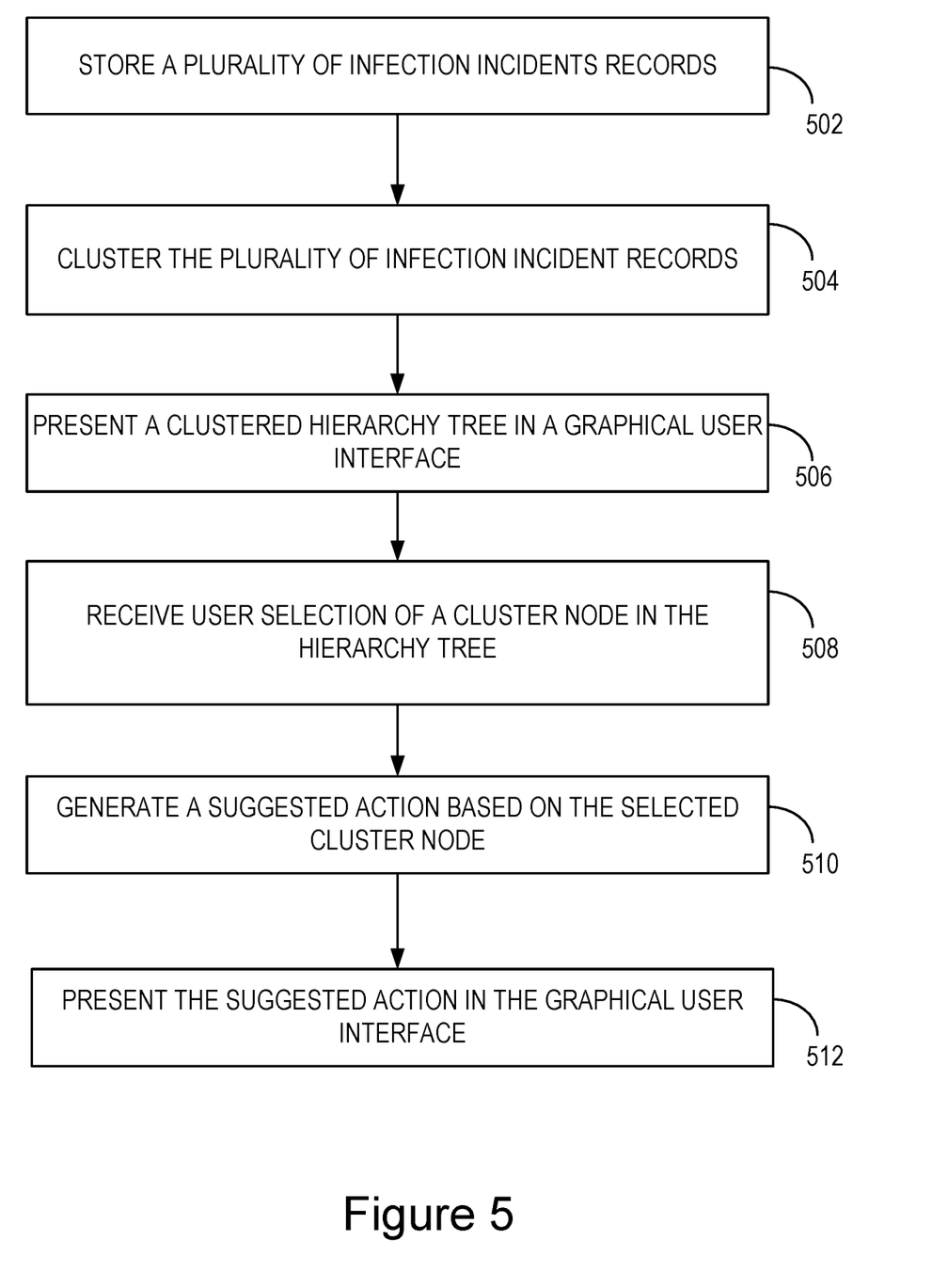
FIG. 5 is a flow chart of an example method for use tree-based visualizations of hierarchical clustering to efficiently respond to incidents.

In some embodiments, the tree generator 124, the recommendation generator 126, the data transmitter 311, the data storage manager 313, the selection receiver 315, and the graphical user interface manager 317 may include computer logic operable to perform the operations described in further detail throughout this specification, for example, in reference to FIGS. 4 through 6.

For example, the tree generator 124 may be programmed to, using a given set of historical and current incident records, implement hierarchical clustering functionality to group similar incident records into nodes (a group of records) and arrange those nodes into a hierarchical tree. The hierarchical tree is arranged such that as one moves down the tree, lower layers have fewer incident records per node but the incidents in each cluster are more closely related. In some example embodiments, the clustering functionality measures a distance between each incident record based on the characteristics of the potential incident.

In another example, the recommendation generator 126 determines, based on a given granularity of depth in the hierarchical tree and the specific incident that the user is investigating, one or more recommended actions. For example, if the cluster selected by the user includes incident records that are ninety five percent the result of a particular computer virus, and the recommendation generator 126 determines that tool A was used to remove the infection in those previous cases, the recommendation generator 126 may recommend that the user employ tool A to remove the infection in the present incident as well.

In an example, the data transmitter 311 transmits data form the incident management system 120 to a client device for presentation, including but not limited to a representation of a generated hierarchical tree and a suggested or recommended action.

The data storage manager 313 may, for example, create incident records for received infection records and maintain the historical incident database 130 and the current incident database 132 to ensure that an appropriate list of incident records can be accessed when running the clustering algorithm.

The selection receiver 315 may, for example, receive user selection of a node within a hierarchical tree or of a particular action that may be able to resolve an infection for which a particular incident record is generated.

The graphical user interface manager 317 uses a generated hierarchical tree to create an interface in which a user can select a given node at a particular granularity and obtain information specific to that node.

FIG. 4A is a user interface diagram illustrating an example of a user interface that displays a graphic representation of a hierarchical tree, according to some embodiments. The tree includes a series of nodes (402 to 420), a node representing a cluster of incidents that have been grouped together based on certain characteristics. Nodes are connected to other nodes via edges. When two nodes are connected by an edge, the upper node is the parent node and the lower node is the child node. A parent node will include the incident records that are included in the child node.

The top or root node 402 is the most general node and the other nodes are connected as child nodes to the top node, either directly or in successive nested generations (e.g., child nodes can in turn have child nodes which are grandchild nodes of the top node 402 and so on). The graphical user interface includes a number in brackets displayed just above the circle representing the node. The displayed number is a reflection of the number of incident records included in that node and its child nodes. For example, node 408 has the number 12 in brackets above it, indicating that 12 incident records are grouped into that node. As seen in FIG. 4A, a child node may contain some or all of the incident records grouped into the parent cluster.

The graphic user interface also displays additional information for each node based on the shape, color, boldness, orientation, position, and the size of the node's representation. This information gives information about the contents of the node. For example, certain nodes have darker lines (e.g., 402, 404, 410, and 414). This is a visual indication showing which node at each level of granularity includes a current incident record. In this way, a user can more easily determine where the current incident record is grouped.

An additional method of given additional information about nodes is the shape of the nodes. For example, in FIG. 4A, node 412 is shaped like a triangle. In this example, the triangle shape indicates that a certain percentage of incident records in the node were published. For example, any node in which 70% of incident records in the node are published will be displayed as a triangle.

Similarly, node 420 is shaped as a square. In this example, nodes are represented as a square when the percentage of incident records that are ultimately ignored (e.g., are false positives) crosses a given threshold. In this way, a user viewing a hierarchical tree can quickly and easily discern important information about teach node.

In some example embodiments, nodes 406 and 418 are filled in with a first line pattern. Being filled with a first line pattern represents, in this example, that a certain percentage of nodes in these clusters were found to be high-threat incidents. In addition, node 414 is filled in with a distinct second line pattern. The second line pattern is used to represent that the user has selected the node and would like additional detail about the node.

FIG. 4B is a user interface diagram illustrating an example of a user interface that displays a graphic representation of a hierarchical tree, according to some embodiments. FIG. 4B continues the example shown in FIG. 4A.

In this example, in response to the user selecting node 414 in FIG. 4A, additional child nodes of the selected node 414 are revealed. Nodes 422, 424, 426, 428, and 430 are now visible. In this way, the user can control the level of granularity that he or she uses when reviewing clustered node information.

As seen in the example in FIG. 4B, the user has selected node 430 which has 5 incident records, as opposed to node 414 which had 34 incident records. A smaller number of incident records ensures that the remaining incident records are more similar to the current incident record.

FIG. 4C is a user interface diagram illustrating an example of a grid-based information display structure for presenting the information associated with the nodes shown in in FIGS. 4A and 4B in a more convenient format.

The grid-based information display structure may be displayed in the same display as the hierarchical tree shown in FIGS. 4A and 4B. In this way, a user can immediately see more details of the node or nodes that the user has selected. In this example, grid-based structure comprises a plurality of row headings, including count 440 (e.g., the number of incident records in the node), incident type 442 (e.g., the category in which a given node of incident records are categorized), an incident time 444 (e.g., when the incident occurred or when it was recorded), a customer severity rating 446 (e.g., includes user experience with how the infection would be rated, and a cluster number 448 (e.g., the number of the associated node in the displayed example).

The columns comprise individual nodes 450, 460, 462, and 464. Since node number 430 was selected in FIG. 4B, the grid-based user interface expands the content of that node to allow for greater inspection. In this case, the expanded node 450 results in the display of incident records 452, 454, 456, and 458. A user can inspect this more detailed information about incident records when making a decision as to which action to perform.

FIG. 5 is a flow chart of an example method 500 for use tree-based visualizations of hierarchical clustering to efficiently respond to incidents. Each of the operations shown in FIG. 5 may correspond to instructions stored in a computer memory or computer-readable storage medium. In some embodiments, the method described in FIG. 5 is performed by the incident management system (e.g., system 120 in FIG. 1).

The method illustrated by the figure is performed on or by an incident management system 120 (e.g., system 120 in FIG. 1) including one or more processors and memory storing one or more programs for execution by the one or more processors.

In some example embodiments, the incident management system stores (502), at database at a computing device, a plurality of incident records, an incident record representing a particular instance of potential infection at a particular computer system. In some example embodiments, an incident record is generated at a client system (e.g., client system 102 in FIG. 1) when a client application detects one or more indicators of a potential infection and transmits a record to the incident management system 120 via a network 110.

In some example embodiments, the incident management system 120 clusters (504), by the computing device, the plurality of incident records into a plurality of nodes and arranges the nodes into a hierarchical tree. The incident management system 120 presents (506) the hierarchical tree to a user. In some example embodiments, presenting includes transmitting the hierarchical data to a client system for display.

In some example embodiments, the incident management system 120 receives (508) a user selection of a particular node in the hierarchical tree, the particular node having an associated level of granularity. Based on the incident records included in the particular node in the hierarchical tree, the incident management system 120 may generate (510) a suggested response to a particular current incident.

The incident management system 120 may transmit (510) the suggested response to the particular current incident to the client system for display.

Example Embodiment

In some example embodiments, an analyst may use a displayed hierarchical tree to quickly and efficiently determine that a given incident and any similar incidents should be determined to be a false positive (and no action would therefore be taken) or assigned one or more resolution actions.

In such an example, the analyst navigates to a root node displayed in a graphical user interface. The analyst may then select a particular incident to work from (e.g., from a list of currently active incidents). In some example embodiments, the system will use an associated unique incident identifier to identify similar incidents throughout the displayed hierarchy tree. In some example embodiments, each tree node (cluster) that contains similar incidents is highlighted using a different color at the node border. In some example embodiments, the other nodes (clusters) not containing incidents similar to the selected incident are greyed-out or alternatively hidden (e.g., a user can choose behavior that they prefer).

In some example embodiments, the content of each node is dynamically displayed in a grid-based information display structure (e.g., see FIG. 4C above). In some example embodiments, a grid-based information display structure may also include a list of the top counted/weighted signatures found in the cluster or node. This information may help the analyst build insights around the incident.

In some example embodiments, while exploring an incident, the analyst can create actions buckets and name them accordingly meaningful contexts, for example: "all network scans false positives" or "all mass mailer worm infection". Action buckets can be created at any time under any context and incidents displayed in b) can be selected/deselected at any time to update any desired action bucket.

In some example embodiments, once the analyst assesses the full scope of the incident and creates proper actions buckets, the analyst can select all the incidents from one or more action buckets and rapidly undertake actions as needed. The bucket is then deleted or marked as "submitted". Actions taken may then be used as recommendations for future investigations (e.g., the shape of a node may be updated) and for further tuning of the clustering algorithm.

In another example embodiment, a semi-automated engine uses previously machine learned rules to automatically decide which incidents to publish and which incidents to mark as read (but not publish). An analyst will use the hierarchical tree in order to quickly get a complete overview of the historical incidents landscape. The analyst is able to select a custom level of granularity from the hierarchical structure in order to evaluate currently existing incidents and past incidents at multiple custom granularities and determine what the semi-automated engine is doing in response to the different types of incidents.

Once the analyst has this overview of the system at different granularity levels, the analyst can update or modify the semi-automated behavior of the system.

As will be understood by those familiar with the art, the invention may be embodied in other specific forms without departing from the spirit or essential characteristics thereof. Likewise, the particular naming and division of the portions, modules, agents, managers, components, functions, procedures, actions, layers, features, attributes, methodologies, data structures and other aspects are not mandatory or significant, and the mechanisms that implement the invention or its features may have different names, divisions and/or formats. The foregoing description, for purpose of explanation, has been described with reference to specific embodiments. However, the illustrative discussions above are not intended to be exhaustive or limiting to the precise forms disclosed. Many modifications and variations are possible in view of the above teachings. The embodiments were chosen and described in order to best explain relevant principles and their practical applications, to thereby enable others skilled in the art to best utilize various embodiments with or without various modifications as may be suited to the particular use contemplated.

What is claimed is:

1. A computer-implemented method comprising:
    storing, at a database at a computing device, a plurality of historical incident records, a historical incident record representing an instance of a potential security incident at a particular computer system and including an encoded incident type;
    clustering, by an automated engine of the computing device, the plurality of historical incident records into a plurality of nodes based on characteristics of the plurality of historical incident records and arranging the nodes into a hierarchical tree, each of the nodes of the hierarchical tree being clustered based on the encoded incident types, the automated engine determining which of the plurality of historical incident records to publish within the plurality of nodes based on machine learned rules and highlighting any of the nodes of the plurality of nodes that satisfy a threshold of published historical incident records;
    presenting at least a subsection of the hierarchical tree in a graphical user interface configured to allow a user to select particular nodes in the hierarchical tree for additional information;
    receiving a user selection of a first node in the hierarchical tree, the first node having an associated level of granularity;
    identifying a current security incident;
    identifying an incident type of the current security incident;

identifying related historical incident records based on the encoded incident type from the plurality of historical incident records included in the first node in the hierarchical tree, the related historical incident records being sufficiently similar to the current security incident based on the incident type;

generating a first suggested response to the current security incident by automatically identifying previous actions from the related historical incident records, the previous actions being taken in response to instances of the potential security incidents related to the current security incident that occur with a threshold degree of frequency among the historical incident records in the first node of the hierarchical tree; and presenting the first suggested response to the current security incident in a graphical user interface.

2. The computer-implemented method of claim 1, wherein the plurality of historical incident records includes the plurality of historical incident records and one or more current security incident records, the one or more current security incident records comprising the current security incident.

3. The computer-implemented method of claim 2, further comprising:

receiving a user-selected action, the action selected in response to the current security incident; and performing the user-selected action.

4. The computer-implemented method of claim 3, further comprising:

evaluating the performed user-selected action to determine whether the current security incident is resolved.

5. The computer-implemented method of claim 3, further comprising:

adding the current security incident to the plurality of historical incident records for future clustering.

6. The computer-implemented method of claim 1, further comprising:

prior to clustering the plurality of historical incident records:

accessing the current security incident from an incident queue; and selecting one or more historical incident records from the plurality of historical incident records based on the accessed current security incident to cluster while generating the hierarchical tree.

7. The computer-implemented method of claim 1, wherein historical incident records include a completed response record.

8. The computer-implemented method of claim 7, wherein generating the first suggested response to the current incident record further comprises:

analyzing one or more historical incident records associated with a node selected by a user;

identifying, from the one or more incident records, one or more completed actions for the one or more historical incident records; and selecting a completed action from the one or more identified completed actions.

9. The computer-implemented method of claim 8, wherein the completed action is selected from the one or more completed actions based on the frequency with which actions were selected in the historical incident records associated with a node selected by the user.

10. The computer-implemented method of claim 8, wherein the completed action is selected from the one or more identified completed actions based on a success rate of the completed actions.

11. The computer-implemented method of claim 1, further comprising:

while presenting the hierarchical tree in the graphical user interface, presenting, adjacent to the hierarchical tree, a grid-based information display structure; and in response to receiving user selection of the first node, presenting additional information associated with the historical incident records included with the first node in the grid-based information display structure.

12. The computer-implemented method of claim 1, further comprising:

responsive to user selection of a first node in the hierarchical tree, updating the hierarchical tree presented in the graphical user interface to display a first child node of the first node and a second child node of the first node, the first child node and the second child node having an associated level of granularity different from the first node.

13. The computer implemented method of claim 12, further comprising:

receiving a user selection of the first child node; and generating a second suggested response based on the incident records included in the first child node, wherein the second suggested response is different than the first suggested response.

14. The computer implemented method of claim 1, wherein the shape, color, size, and boldness used to display a node in the graphical user interface is associated with at least one attribute of the node.

15. At least one non-transitory computer readable-storage medium storing computer executable instructions that, when loaded into computer memory and executed by at least one processor of a computing device, cause the computing device to execute the following steps:

storing, at a database at a computing device, a plurality of historical incident records, a historical incident record representing an instance of a potential security incident at a particular computer system and including an encoded incident type;

clustering, by an automated engine of the computing device, the plurality of historical incident records into a plurality of nodes based on characteristics of the plurality of historical incident records and arranging the nodes into a hierarchical tree, each of the nodes of the hierarchical tree being clustered based on the encoded incident types, the automated engine determining which of the plurality of historical incident records to publish within the plurality of nodes based on machine learned rules and highlighting any of the nodes of the plurality of nodes that satisfy a threshold of published historical incident records;

presenting at least a subsection of the hierarchical tree in a graphical user interface configured to allow a user to select particular nodes in the hierarchical tree for additional information;

receiving a user selection of a first node in the hierarchical tree, the first node having an associated level of granularity;

identifying a current security incident;

identifying an incident type of the current security incident;

identifying related historical security incident records based on the encoded incident type from the plurality of historical incident records included in the first node in the hierarchical tree, the related historical incident records being sufficiently similar to the current security incident based on the incident type;

generating a first suggested response to the current security incident by automatically identifying previous actions from the related historical incident records, the previous actions being taken in response to instances of the potential security incidents related to the current security incident that occur with a threshold degree of frequency among the historical incident records in the first node of the hierarchical tree; and presenting the first suggested response to the current security incident in a graphical user interface.

16. The non-transitory computer readable-storage medium of claim 15, wherein the plurality of historical incident records includes the plurality of historical incident records and one or more current security incident records, the one or more current security incident records comprising the current security incident.

17. The non-transitory computer readable-storage medium of claim 16 further storing computer executable instructions that, when loaded into computer memory and executed by at least one processor of a computing device, cause the computing device to execute the following steps:
receiving a user-selected action, the action selected in response to the current security incident; and
performing the user-selected action.

18. A computer system comprising:
system memory;
a storage module residing in system memory, the storage module being programmed to store, at a database at a computing device, a plurality of historical incident records, a historical incident record representing an instance of a potential security incident at a particular computer system and including an encoded incident type;
a clustering module residing in system memory, the clustering module being programmed to use an automated engine to cluster the plurality of historical incident records into a plurality of nodes based on characteristics of the plurality of historical incident records and arranging the nodes into a hierarchical tree, each of the nodes of the hierarchical tree being clustered based on the encoded incident types, the automated engine determining which of the plurality of historical incident records to publish within the plurality of nodes based on machine learned rules and highlighting any of the nodes of the plurality of nodes that satisfy a threshold of published historical incident records;

a presentation module residing in system memory, the presentation module being programmed to present at least a subsection of the hierarchical tree in a graphical user interface configured to allow a user to select particular nodes in the hierarchical tree for additional information;
a reception module residing in system memory, the reception module being programmed to receive a user selection of a first node in the hierarchical tree, the first node having an associated level of granularity;
a generation module residing in system memory, the generation module being programmed to identify a current security incident, identify an incident type of the current security incident, identify related historical incident records based on the encoded incident type from the plurality of historical incident records included in the first node in the hierarchical tree, the related historical incident records being sufficiently similar to the current security incident based on the incident type, and generate a first suggested response to the current security incident by automatically identifying previous actions from the related historical incident records, wherein the previous actions being taken in response to instances of the potential security incidents related to the current security incident that occur with a threshold degree of frequency among the historical incident records in the first node of the hierarchical tree;
a suggestion module residing in system memory, the suggestion module being programmed to present the first suggested response to the current security incident in a graphical user interface; and
at least one processor configured to execute the modules.

19. The computer system of claim 18, wherein the plurality of historical incident records includes the plurality of historical incident records and one or more current security incident records, the one or more current security incident records comprising the current security incident.

20. The computer system of claim 19, further comprising:
an action reception module residing in system memory, the action reception module being programmed to receive a user-selected action, the action selected in response to the current security incident; and
performing the user-selected action.

* * * * *